No. 646,276. Patented Mar. 27, 1900.
W. T. FOLLWEILER.
VENTILATED PAIL.
(Application filed Jan. 10, 1900.)
(No Model.)
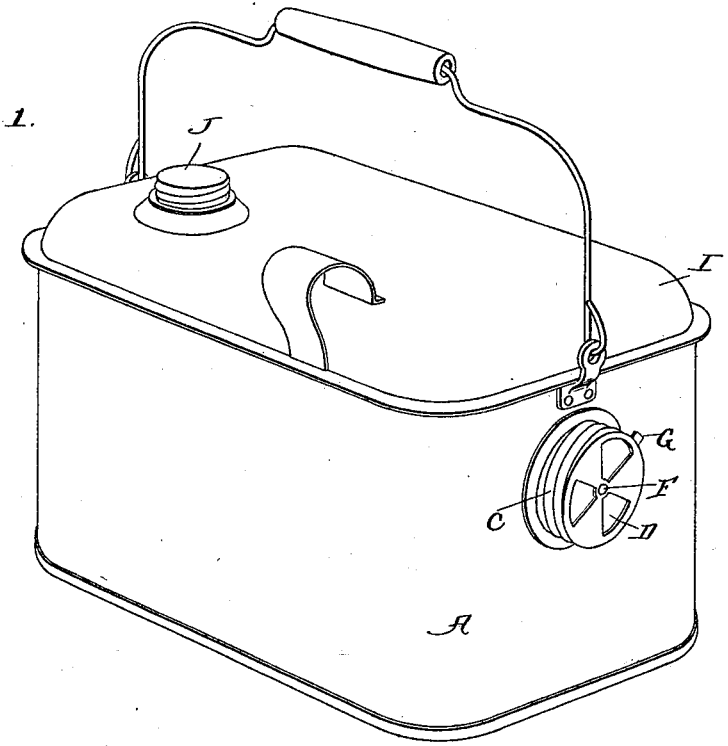
Fig. 1.
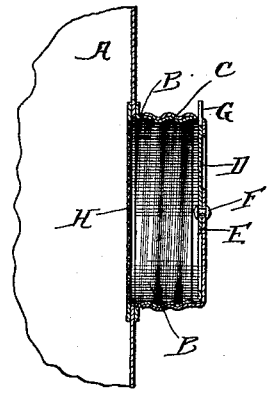
Fig. 2.
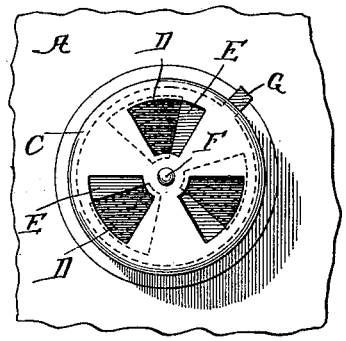
Fig. 3.
Witnesses
H. B. Hallock.
J. S. Williamson
Inventor
Warren T. Follweiler
By 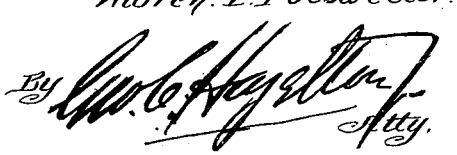
Atty.

UNITED STATES PATENT OFFICE.

WARREN T. FOLLWEILER, OF TAMAQUA, PENNSYLVANIA.

VENTILATED PAIL.

SPECIFICATION forming part of Letters Patent No. 646,276, dated March 27, 1900.

Application filed January 10, 1900. Serial No. 982. (No model.)

*To all whom it may concern:*

Be it known that I, WARREN T. FOLLWEILER, a citizen of the United States, and a resident of Tamaqua, county of Schuylkill, and State of Pennsylvania, have invented a certain new and useful Improvement in Ventilated Pails, of which the following is a specification.

My invention relates to a new and useful improvement in ventilated pails, and has for its object to provide a simple arrangement for effectually ventilating dinner-pails and the like, so as to permit the escape of moisture and odor from the pail and thus preserve its contents in more palatable condition.

With these ends in view this invention consists in the details of construction and combination of elements hereinafter set forth and then specifically designated by the claims.

In order that those skilled in the art to which this invention appertains may understand how to make and use the same, the construction and operation will now be described in detail, referring to the accompanying drawings, forming a part of this specification, in which—

Figure 1 is a perspective of a pail made in accordance with my improvement; Fig. 2, an enlarged section of the ventilating apparatus, and Fig. 3 a front view of the ventilator.

In carrying out my invention as here embodied I provide the pail A, which may be of any convenient shape or size, with a threaded collar B, adapted to receive the correspondingly-threaded cap C. The front of this cap has formed therein the radial openings D, which are regulated by the valve E, the latter consisting of a disk having corresponding openings therein and pivoted against the inside of the cap by means of the rivet F. A small offset G projects through a slot in the side of the cap and serves as a handle for turning the valve-disk upon its axis. By this arrangement it will be seen that the full capacity of the openings D may be utilized for ventilating the interior of the pail, or the passage through these openings may be reduced or entirely closed by the proper manipulation of the valve-disk, and when closed the pail will serve the purposes of an ordinary pail. A screen H is secured over the inner end of the collar and is of a mesh sufficiently fine to prevent the insects from gaining access to the interior of the pail, so that while the pail is open to ventilation it may be placed anywhere without ants and such insects gaining access to its contents. The cover I is hollow and serves as a liquid-receptacle, having a screw-cap J, by which access is gained to the interior thereof.

In practice after various articles of food have been placed in the pail, some of which are usually hot, the ventilator is so regulated as to permit the steam and moisture arising from these articles of food to pass from the pail, and when this food has cooled the ventilator may be further closed, leaving just sufficient opening to permit the escape of the various odors and thus prevent to a large degree the contamination of one article of food by another.

The cost of manufacture of my improvement is exceedingly small and may be applied to any style of pail, and the parts thereof may at any time be readily washed and cleansed by the removal of the cap C, which gives access to the threaded collar as well as to the interior of the valve-disk.

Having thus fully described my invention, what I claim as new and useful is—

1. In combination with a pail of the character described, a ventilator consisting of a threaded collar so set as to correspond with an opening in the side of the pail, a correspondingly-threaded cap adapted to be secured upon said collar, said cap having radial openings therein, a valve also having radial openings therein pivoted to the cap so as to regulate the passage through the openings in the cap, and a screen secured over the inner end of the threaded collar, as specified.

2. As a new article of manufacture, a dinner-pail having an opening in the side thereof, a screen covering said opening, a threaded collar secured to the pail over said opening, a cap threaded upon the collar, said cap having openings therein, a valve-disk pivoted to the inside of the cap, and an offset projecting through a slot in said cap, whereby the valve may be regulated, as specified.

In testimony whereof I have hereunto affixed my signature in the presence of two subscribing witnesses.

WARREN T. FOLLWEILER.

Witnesses:
M. D. KASE,
H. F. ZIMMERMAN.